Oct. 6, 1931.                B. L. BROOKS                1,826,270
                           ARTIFICIAL TOOTH
                         Filed May 16, 1925
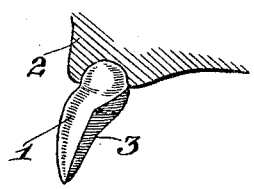
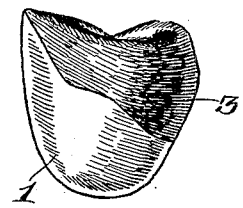
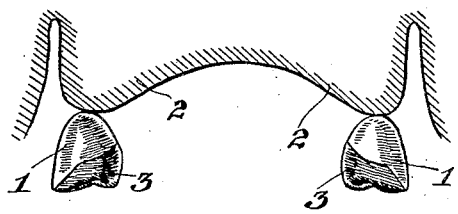
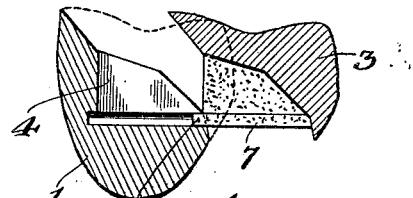
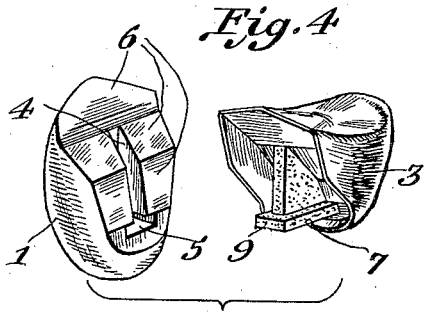
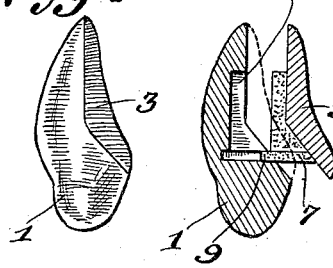
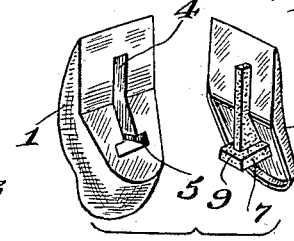
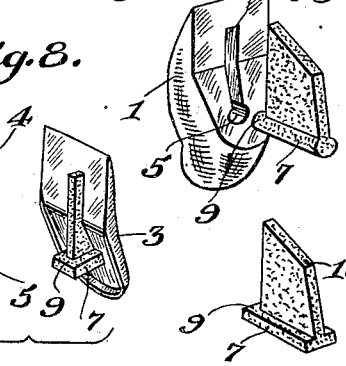
Inventor
Benjamin L. Brooks
By Mason Fenwick & Lawrence
Attorneys Patented Oct. 6, 1931

1,826,270

UNITED STATES PATENT OFFICE

BENJAMIN L. BROOKS, OF LYNCHBURG, VIRGINIA

ARTIFICIAL TOOTH

Application filed May 16, 1925. Serial No. 30,860.

This invention relates to a removable, interchangeable porcelain facing, having a porcelain roots with the root end portions rounded and somewhat egg shape, thickened more labially and buccally to lingual than on the mesial to distal surfaces.

The root end surface is glazed smooth and adapted for dummies and pontics in dental bridge work. The glazed end portion is intended to fit up flush to the tissues of the alveolar ridge or somewhat into the root socket in the alveolar ridge, thereby forming and producing a more natural and sanitary arrangement approaching closely the anatomical tooth form at the point of the gum line and alveolar ridge.

Furthermore this invention relates more especially to a slot or recess extending into the lingual surface of the porcelain facing and root portion into which a pin or attaching device is placed for the purpose of cementing with a dental cement to secure the porcelain portion fast to the pin attaching device. The said pin attaching device is made attached to a metal backing by soldering casting or other means of attaching known to the metal arts. The metal backing is made adaptable to the cut away lingual and occlusal surfaces of the porcelain root facing and upon this metal backing and cut away surface is a recess for adding additional metal which serves to strengthen the backing for stress and as a means of attaching the dummies or pontics and abutment pieces together to form the span portion of metal backing common to all fixed dental bridge work.

Still another object of this invention is the novel arrangement of the pin or attaching device which slides into the slot or recess of the porcelain facing or root portion as around which is placed dental cement for securing the porcelain facing and root to the pin and thereby to dental bridge, the pin or attaching device being adapted to be secured to the metal backing common to dental bridgework.

This invention has for another object, an interchangeable or replacement feature which can be done while the bridge is fastened or cemented to place in the mouth and without removing same from the mouth. This is made possible by the novel arrangement of a slot in the porcelain facing and root portion, together with the novel manner and position of the pin attaching device which has been made a part of the metal backing of the bridge. Which backing serves as the abutment span or support.

The slot in the porcelain faced root enters from the lingual side. The pin attaching device projects from the metal backing toward the labial or buccal surfaces in such a manner as to allow the porcelain facing root to slip back on the pin toward the lingual at about right angles to the long axis of the tooth facing in pushing to place, the reverse in removing.

In the drawings,

Fig. 1 illustrates a vertical section through the anterior upper gum with a tooth in place and mounted on this backing, tooth extending slightly into root socket.

Fig. 2 designates a transverse section through the mouth of the upper jaw or upper maxilla, showing the tooth mounted on this gold backing and extending flush to gum tissue.

Fig. 3, represents a side elevation view of the tooth as disclosed in Fig. 2.

Fig. 4 represents a perspective view of Fig. 3, showing parts as they would appear with a gold backing mounted on the pin or attaching device.

Fig. 5 represents a vertical section view through Fig. 4 with the pin or attaching device partly inserted in the slot or recess of facing or tooth.

Fig. 6 represents a side elevation view of an anterior tooth.

Fig. 7 designates a vertical section view of the anterior tooth and root facing, showing the pin or attaching device mounted with gold backing and partially inserted in the backing or tooth.

Fig. 8 represents a perspective view of Fig. 6 and 7, showing a T pin construction of the attaching device.

Fig. 9 illustrates a perspective view slightly modified over Fig. 8 showing the pin or attaching device with a round pin base.

Fig. 10 illustrates the pin or attaching device with a flat T pin base.

Numeral 1 represents a porcelain faced and rooted tooth as it is adapted to the anterior ridge 2, while numeral 3 shows the gold backing with pin or attaching device as mounted in place on the porcelain faced tooth 1.

Numeral 4 designates a receiving slot or recess in the porcelain root faced tooth 1, having a T pin base slot 5.

The lingual and occlusal or top portion of this tooth 6, is cut away and ground to allow an interchangeable gold mounting 3, with an attaching pin having either a round or T base 7, it being understood in this application that the base of the pin or attaching device may be either round or otherwise for the purposes of this invention; the said pin attaching device being adapted for permanent attachment by cementing to the gold backing 3, and insertion into the slots 4 and 5 of the porcelain tooth 1, the attaching pin or device being composed of a flat upright portion having along the lower edge or base thereof, a suitable shaft flanged either of rectangular or round shape as at 7, the forward end of the flange preferably extending a short distance beyond an edge of the flat portion of the pin attaching device as at 9, the flat upright portion having a suitable extension as at 10 adapted for permanent attachment to gold backing 3. Obviously, the flanged portions 7 could be termed either top or base sections without in any manner affecting the merits of this invention. Obviously the pin or attaching device 10 is made of a suitable metal and can be smooth, notched, grooved or otherwise roughened along its base and upright flanged portion to provide a recess affording a firm adherence and attachment for cement in securing the porcelain faced root portion 1.

This invention provides an improved means for applying porcelain facings with attached round, glazed root ends to a gold or other metal backing in dental bridge-work, particularly to the means of attaching a pin fastening device to the porcelain portion for the purpose of retaining the porcelain fast to the bridge or backing. The slot 4 and 5 of the porcelain facing root in the bicuspid and molars is so arranged that the base slot 5, enters at the lingual side at about the root end third in the bulky portions of the porcelain and extends about at right angles to the long axis of the tooth into and at a point close to the labial or the anterior tooth and the buccal surfaces in the posterior teeth bicuspids and molars, but not through, providing a recess slightly beyond that portion of adjoining angle of slot 4 to receive that projection of the metal pin attachment 9, Fig. 10. That portion of slot 5 forming the top of the T shape slot is intended to be either as shown, rectangular or round, or otherwise a suitable form to answer this purpose of the invention. This portion of the slot 5 is broader and larger with an extending recess into the labial and buccal bulk of porcelain than that upright portion of the slot 4. This slot is arranged and shaped like an inverted T with the top portion toward the root end to form the base and seat, and to provide a stronger grip in the greater porcelain bulk at right-angles to the occlusal stress on the porcelain which it is designed to bear. That portion of slot 4 extending upward with the long axis to the tooth has about parallel walls and slightly narrower than that part of slot 5. Slot 4 receives the upright flange or wing of the metal attachment, thus allowing still greater grip to the porcelain when cemented. The upright metal flange of the pin device serves to brace the base portion of the pin which fits into that part of the slot 5. The cut away lingual portion and slot in the porcelain facing and root end of an anterior tooth, Figs. 1, 6, 7, 8 and 9 and the metal pin portion 10, differs slightly from that in the bicuspids and molars as shown in the drawings 7, 8 and 9, which fairly well illustrates the modification, it being understood that the metal pin attaching device and its mounting may be modified slightly from that of the posteriors as in Fig. 4 to conform to the requirements of the anterior teeth.

The invention is susceptible to those modifications which will be obvious to workers in the dental and ceramic arts without departing from the scope and purpose of this invention, as for example, to make up the metal pin attachment device mounted permanently to a thin metal backing to conform to the cut away lingual and occlusion portion of the porcelain, or without this backing but with the pin extending slightly out of the slot to allow the inset of an attachment means for the backing in any way suitable to the dental art. In the porcelain portion the manner and means of placing the slot may be changed to conform to the ceramic art, so long as it does not change the scope and purpose of the invention.

Obviously the pin attaching device is made of a suitable metal and is formed to fit into the slot arranged in the porcelain portion allowing room for interposing a dental cement for securing purposes.

This invention provides an artificial porcelain faced tooth with rounded root end adapted for dummies and pontics in dental bridgework and is replaceable or interchangeable in case of fracture or breakage, or for the purpose of grinding, fitting, adding to glazing or changing color while the bridge is either in or out of the mouth.

What I claim is:

1. An artificial porcelain tooth facing having an all porcelain glazed root end, the lingual side of said facing being provided beyond said root end with flat surfaces forming a dihedral angle whose apex extends transversely of the facing, said facing being formed with a vertically elongated slot opening in said surfaces and extending toward the labial portion of said facing, said slot intersecting the apex of the angle formed by said surfaces, and a metal backing coincident with said plane surfaces having a plate fitting said slot, said slot being concealed by said backing when the latter is in place.

2. An artificial porcelain tooth facing having an all porcelain glazed root end, the lingual side of said facing being provided beyond said root end with flat surfaces forming a dihedral angle whose apex extends transversely of the facing, said facing being formed with a slot opening in said surfaces and extending toward the labial portion of said facing, said slot intersecting the apex of the angle formed by said surfaces, the surface adjacent the root end being formed with a bore of larger width than that of said slot, and opening into said slot, and a metal backing coincident with said plane surfaces having a projecting portion fitting said slot and bore, said bore being concealed by said backing when said backing is in place.

3. An artificial tooth comprising a facing having a root extension, the occlusal side of said root extension forming a transverse surface, the lingual side of said facing having a longitudinally extending surface intersecting the former surface at an angle, each of said surfaces having a slot therein, a backing having complementary surfaces, and tongue portions adapted to be received in said slots.

In testimony whereof I affix my signature.

Dr. BENJAMIN L. BROOKS.